Patented Feb. 2, 1937

2,069,529

UNITED STATES PATENT OFFICE 2,069,529

CHEMICALLY STABILIZED GLUCOSIDES AND GLUCOSIDE BEARING DRUGS

Vincent A. Lapenta, Indianapolis, Ind.

No Drawing. Application March 16, 1934, Serial No. 715,917

2 Claims. (Cl. 167—65)

The invention relates to the protection and preservation of digitaloid or digitalis products against loss of medicinal power due to aging of such products; and more particularly to the stabilization of such products against deterioration, by combining with same, floroglucinol, known chemically as 1.3.5-tri-hydroxybenzene.

It is a primary object of the invention to combine 1.3.5 tri-hydroxybenzene with powdered leaves, glucoside solutions, alcoholic solutions and aqueous solutions in general, to protect the same against loss of potency over the periods of time during which it is well known that deterioration otherwise regularly occurs.

It is also a primary object of the invention to combine with products of these classes a protector which is non-toxic, which has no cardiac effects when administered, but which exerts a powerful stabilization and protecting action on such products.

The above and other objects are attained by the methods and combination of products hereinafter described.

The floroglucinol or 1.3.5-tri-hydroxybenzene, is combined with powder leaves, for example with digitalis leaves by mixing with same in suitable apparatus in amounts equal to from 0.01 of one per cent to 0.25 of one per cent of the leaves, by weight; the same hydroxybenzene is combined with alcoholic solutions, for example with the U. S. P. tincture by addition to same in the amounts of 0.03 of one per cent to 0.40 of one per cent of the tincture, by volume; with all water solutions of isolated glucosides, in the same proportions; and with other aqueous solutions in the same proportions.

Said combinations have been found to be stabilized against losing strength by the following tests:

A portion of tincture of digitalis containing the floroglucinol is assayed by the one-hour frog test, prescribed by the U. S. Pharmacopia—X, after boiling in a sealed ampoule for one hour, and shows no loss in potency whatever. The same test is then made upon another portion of the same tincture of digitalis assayed before and after boiling and without the floroglucinol, and shows fifteen per cent (15%) to forty per cent (40%) loss in potency after boiling.

I have combined floroglucinol in the amounts indicated above with other drugs of the so called digitalis group and found that it protects them against deteriorating agencies in a like manner with digitalis.

The drugs of the digitalis groups are hypocynum, squills, convallaria, adonis, and all are likewise efficiently combined, in carrying the invention into effect, with the floroglucinol and are likewise shown to be protected against loss of potency.

In further carrying out the invention the floroglucinol is also combined as a protective ingredient with extracts, powdered extracts, powdered isolated extracts, purified extracts, powdered isolated glucosides, tinctures, fluid extracts, glucosides, hydroalcoholic solutions, and practically all forms of aqueous solutions and alcoholic solutions of digitalis and the other digitalis group of drugs above mentioned.

The use of floroglucinol as above designated is totally harmless to the respective drug, and likewise harmless to the subjects upon which it is used, even when added in much greater proportions than necessary to protect the respective drug against deterioration.

While the foregoing describes the use of floroglucinol as combined with digitalis and a number of the digitalis group of drugs, and classes of same, it is understood that the invention is not restricted to the particular examples shown, but that it may be combined generally with powdered extracts, and all types of aqueous and alcoholic drugs containing glucosides with the same stabilizing and protective result.

The invention claimed is:

1. A tincture of digitalis containing a small amount of floroglucinol to preserve the same.

2. A tincture of glucoside containing a small amount of floroglucinol to preserve the same.

VINCENT A. LAPENTA.